(12) United States Patent
Desiderio et al.

(10) Patent No.: US 7,496,106 B2
(45) Date of Patent: Feb. 24, 2009

(54) METHODS AND APPARATUS FOR PROVIDING SIGNALLING GATEWAYS WITH MULTI-NETWORK SUPPORT

(75) Inventors: Didier Desiderio, Le Cannet (FR); Philippe Bouckaert, Biot (FR); Francois Brepson, Le Cannet (FR); Jean-louis Eynaud, Cagnes sur Mer (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 11/181,011

(22) Filed: Jul. 12, 2005

(65) Prior Publication Data

US 2006/0023728 A1 Feb. 2, 2006

(30) Foreign Application Priority Data

Jul. 23, 2004 (EP) ................................. 04300470

(51) Int. Cl.
*H04L 12/28* (2006.01)
*H04L 12/66* (2006.01)
(52) U.S. Cl. ....................................... 370/401; 370/352
(58) Field of Classification Search ........................ None
See application file for complete search history.

(56) References Cited

U.S. PATENT DOCUMENTS

| 6,823,061 | B2* | 11/2004 | Prasad et al. ................. 379/230 |
| 6,885,872 | B2* | 4/2005 | McCann et al. ............. 455/466 |
| 7,043,002 | B2* | 5/2006 | Delaney et al. ............. 379/229 |
| 7,103,037 | B2* | 9/2006 | Roque et al. ................. 370/356 |
| 7,209,759 | B1* | 4/2007 | Billing et al. ................ 455/466 |
| 7,283,519 | B2* | 10/2007 | Girard ........................ 370/353 |
| 7,363,381 | B2* | 4/2008 | Mussman et al. ........... 709/230 |
| 2003/0041122 | A1 | 2/2003 | Segal ........................... 709/219 |
| 2003/0231643 | A1 | 12/2003 | Gilchrist et al. ............. 370/401 |
| 2004/0001517 | A1 | 1/2004 | Lamberton et al. .......... 370/522 |

FOREIGN PATENT DOCUMENTS

| EP | 1 377 082 A1 | 1/2004 |
| WO | 01/82635 A1 | 1/2001 |

OTHER PUBLICATIONS

Loughney, J., et al., "SS7 SCCP-User Adaptation Layer (SUA) <draft-ietf-sigtran-sua-07.txt>", *IETF*, Jun. 30, 2002, accessed via internet: <http://www.openss7.org/docs/draft-ietf-sigtran-sua-07.txt>, retrieved on Jun. 26, 2004.
Sidebottom, G., et al., "RFC 3332 Signaling System 7 (SS7) Message Transfer Part 3 (MTP3)—User Adaptation Layer (m3UA)", *IETF*, Sep. 2002 (120 pages).

* cited by examiner

*Primary Examiner*—Wing F Chan
*Assistant Examiner*—Eunsook Choi

(57) ABSTRACT

Gateway apparatus is described for interconnecting at least first and second signalling networks with an application server process via a third network, the apparatus comprising: a plurality of signalling gateways, with at least one signalling gateway coupled to each signalling network; and a proxy element for transferring signalling messages between the signalling gateways and the application server process via the third network. The first and second signalling networks may be separate signalling system 7 (SS7) networks and the third network may be an internet protocol network.

13 Claims, 13 Drawing Sheets

METHODS AND APPARATUS FOR PROVIDING SIGNALLING GATEWAYS WITH MULTI-NETWORK SUPPORT

BACKGROUND OF THE INVENTION

1. Field of the Invention

The invention relates to methods, and related apparatus, for controlling and configuring processing entities used, for instance, in communication systems such as for the control of signalling traffic between a signalling network and an application server for performing tasks such as implementing a short message service centre, toll free number translations and maintaining location registers, for instance.

2. Background Art

Establishing connections between two telephones involves a complex interaction of digital messages, hereinafter referred to generally as signalling. Nowadays telephone systems perform what is known as "out-of-band" signalling. Out-of-band signalling means that the communications required between the switches and other equipment in the network take place on communication channels other than the channel by which the voice or data flows. Typically, the out-of-band signalling takes place by means of digital communication channels. Thus, the public switched telephone network (PSTN) generally uses two types of channels, media and signalling.

Several protocols have been defined for out-of-band signalling. The most commonly used protocol, in North America, Asia and Europe, is known as Signalling System No. 7 (SS7). However, the SS7 protocol defines more than just a protocol for communication between switches. It also defines an entire switching network for facilitating signalling for call establishment, routing, and information exchange functions of switched circuit networks. The SS7 set of protocols come in different flavours, according to standards published by ANSI and ITU respectively, with slight differences between them. ANSI SS7 is used in the US and Canada and various variants of ITU SS7 are used in other countries.

Since the amount of data transferred over data networks is now much larger than the voice traffic that is carried over the PSTN, carriers are in the process of consolidating both data networks and the PSTN. In addition, telecommunication networks are increasingly making use of standard computing hardware in order to reduce IT costs.

Therefore, there is a trend in the telephone industry to migrate telephone systems using SS7-based networks for signalling to Internet Protocol (IP) networks. The Internet protocols are standardised by the Internet Engineering Task Force (IETF). Moving either or both of the media and signalling channels to an IP infrastructure involves the use of very different technologies and can be done independently. One IETF working group, called the Sigtran Group, is defining the protocols for back-hauling SS7 signalling messages across IP networks. Generally speaking, signalling across an IP network involves replacing the lower levels of the SS7 layered protocol communications and transport layers with IP network protocol communications and transport layers.

The IETF in collaboration with the SIGTRAN group have taken the initiative to define open standards for transporting SS7 over IP networks. With SIGTRAN technology, telephone services which today lie on top of SS7 networks, can run Application Servers (ASs) lying on top of IP networks. The interworking with SS7 networks is performed by SIGTRAN signalling gateways (SGs).

To enhance the availability of the signalling gateway, it can be distributed over several processes running in one or several computers, each of them being a Signalling Gateway Process (SGP). Every SGP belonging to a particular SG has the same SS7 point code (or the same list of PCs), with each SGP being connected to the SS7 network through redundant links.

On the IP side, each SGP is connected to Application Servers running the services. Each Application Server, which can typically be identified with a single logical service, such as a Short Message Service Centre (SMSC), can be implemented in a distributed manner by one or more processes or computers—referred to as the Application Server Processes (ASPs). To provide improved reliability, each SGP is typically directly connected to each ASP through an SCTP association such that there is one association between each SGP and each ASP.

In view of the global spread of the Internet, it can be necessary for an AS to handle traffic that has been backhauled from more than one type of SS7 network. This invention is directed generally to enabling multiple signalling networks to be connected to a single application server element.

SUMMARY OF THE INVENTION

In brief, this is achieved by gateway apparatus for interconnecting at least first and second signalling networks with an application server process via a third network, the apparatus comprising: a plurality of signalling gateways, with at least one signalling gateway coupled to each signalling network; and a proxy element for transferring signalling messages between the signalling gateways and the application server process via the third network.

Preferably, the proxy element appears as a single application server process to each signalling gateway and the apparatus is arranged for use with an application server process that is configured to handle signalling traffic for a plurality of logical application servers, with at least one logical application server corresponding to each signalling network. Each logical application server may, for instance, correspond to a routing context configured in a respective signalling gateway.

The first and second signalling networks may be separate signalling system 7 (SS7) networks and the third network may be an internet protocol network.

Viewed from another aspect, there is provided a method of operating a switched circuit telephone network comprising: coupling a first telephone switch to a first signalling gateway across a first signalling network; coupling a second telephone switch to a second signalling gateway across a second signalling network; wherein the first and second signalling gateways each receive signalling messages from an application server process across a third network; and coupling a proxy element between the first and second signalling gateways and the application server process, the proxy element being adapted to distribute the signalling messages from the application server process to the signalling gateways.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

Figure 1:
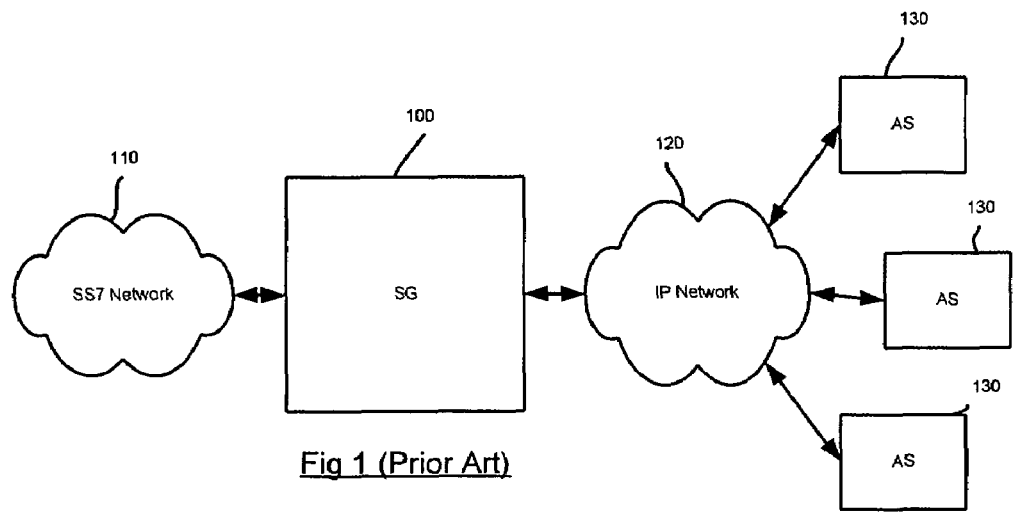
FIG. 1 shows the general configuration of a signalling gateway.
Figure 2:
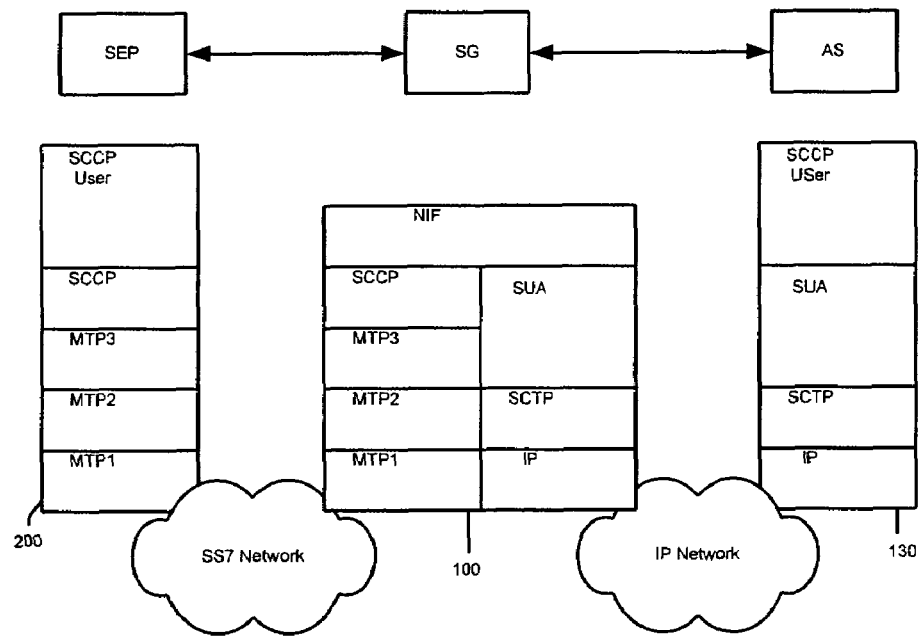
FIG. 2 shows a basic configuration of the different layers of the layered protocol communications schemes of a Signalling End Point, a Signalling Gateway Process and an Application Server Process.

FIG. 1 shows the general configuration of a signalling gateway 100 interconnecting an SS7 network 110 and a series of Application Servers (ASs) 130 via an IP Network 120. FIG. 2 illustrates the layered software architecture of the various components. In the example shown, a signalling end point (SEP) 200 (which could be a telephone switch, for instance) includes the MTP1, MTP2, MTP3, SCCP and SCCP user part layers. Only one such signalling end point 200 is shown in FIG. 2 for simplicity of the drawing; however, it is understood that many signalling end points may be coupled to the signalling gateway 100, either directly or through one or more signalling transfer points. The MTP layers comprise three levels. Levels 1 and 2 are used for the transfer of SS7 messages from one point to another over individual signalling links. Level 3 is used for the transfer of SS7 messages over the SS7 network beyond the requirements of individual link transmission. The MTP3 layer is mainly dedicated to ensuring the delivery of incoming and outgoing messages (such as discrimination, distribution and routing), and the network reconfiguration (such as traffic management, route management and link management).

Communication between Signalling Gateway Processes (SGPs) of the SG 100 and Application Server Processes (ASPs) within the ASs 130 is carried out using a transport layer defined by the SIGTRAN working group and referred to as SCTP (Stream Control Transfer Protocol). Signalling Gateway 100 terminates the MTP1, MTP2, MTP3 and SCCP layers and includes a Nodal Interworking function (NIF) as well as SUA and SCTP and IP layers. Each AS 130 includes IP, SCTP, SUA and SCCP user layers. Signalling Gateway 100 thus terminates the SS7 lower layers and encapsulates their payload data into SCTP messages to send them to an Application Server 130. The AS terminates the SCTP layers, processes the signalling messages and replies to the SG 100 in the same way.

Figure 3:
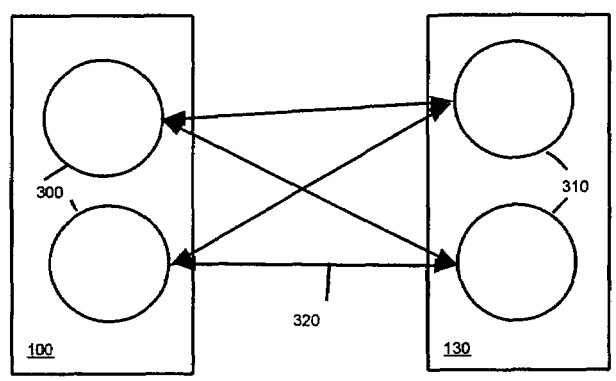
FIG. 3 shows an arrangement in which 2 application server processes are connected to 2 signalling gateway processes via four SCTP associations.

FIG. 3 shows a typical prior art arrangement in which two ASPs within an AS 130 are connected to two SGPs within an SG 100 via four SCTP associations 300.

This architecture is well known to those skilled in the relevant art and is described in the SUA specification defined by the IETF.

Figure 4:
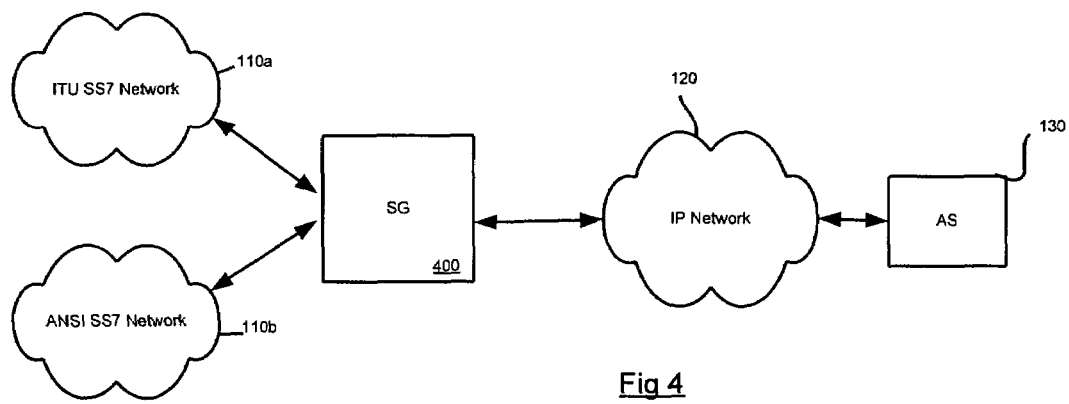
FIG. 4 shows an arrangement in which a signalling gateway interconnects 2 different SS7 networks and an application server.

FIG. 4 shows an arrangement in which an SG 100 interconnects 2 different SS7 networks 110a and 110b and an AS 130. In general terms, the present embodiments allow multiple signalling networks to be connected to a single application server element in situations, even where neither the signalling gateway nor the application server elements are designed to support this, by providing a separate proxy element between the ASPs and SGPs supporting the different signalling networks. The proxy element appears to each SGP as a single Application Server and the ASPs act as if they were configured to process traffic for more than one logical Application Server. The proxy includes functionality that is configured to appropriately direct messages to separate Signalling Gateways that are to respective signalling networks.

Figure 5:
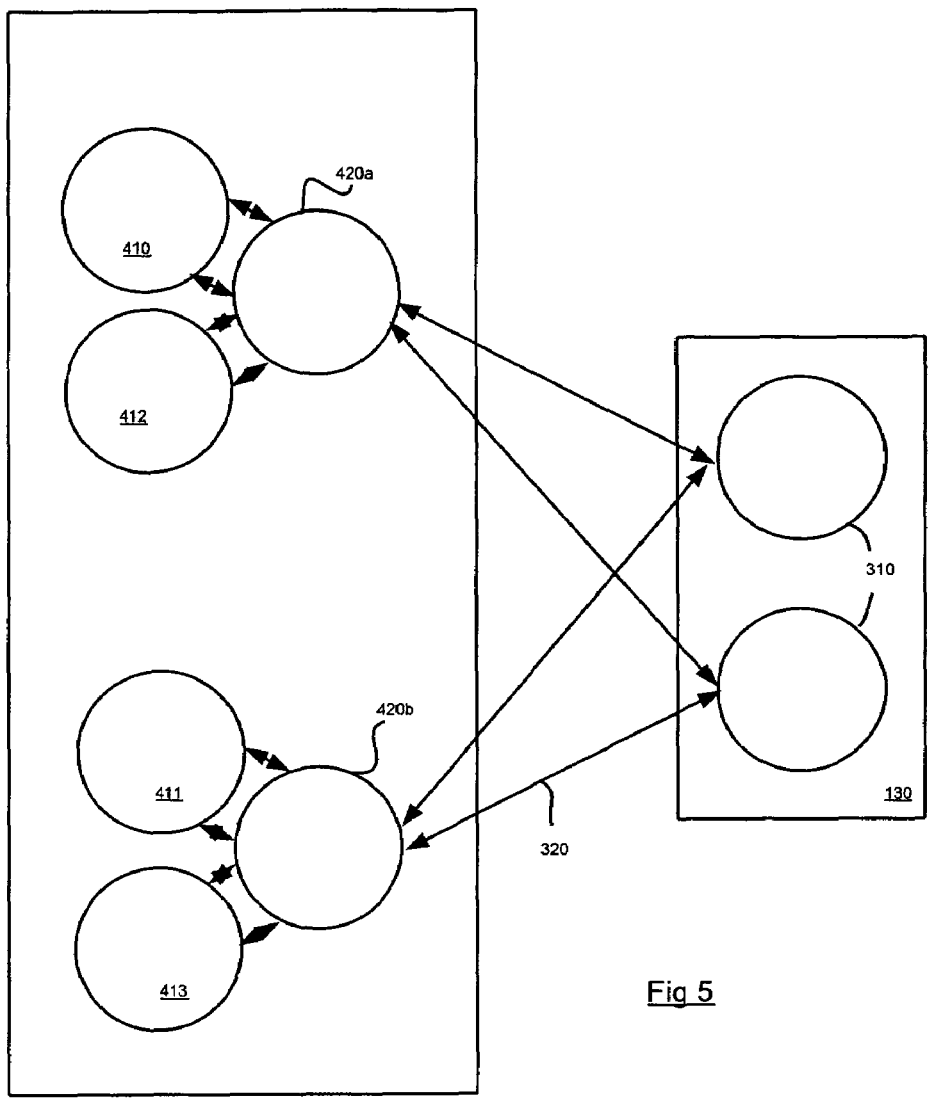
FIG. 5 shows the signalling gateway of FIG. 4 in more detail.

FIG. 5 shows SG 400 in more detail in an example topology. An application server element 130 is shown as being made up of two ASPs 310 which may be active and standby instances, for example. In this example SG 400 is shown as comprising four SGPs of two different types. SGPs 410 and 411 are instances of a Signalling Gateway that is adapted and configured for ITU SS7 networks. SGPs 412 and 413 are instances of a signalling gateway that is adapted and configured for ANSI SS7 networks. Each arrow in the diagram represents an SCTP association. In this case, two instances of a proxy component 420 are provided that act as a front end for the SCTP associations from the ASPs.

A routing key describes a set of SS7 parameters and parameter values that uniquely define the range of signalling traffic to be handled by a particular Application Server. The Routing Context is a value that uniquely identifies a Routing Key. AS element 130 has a first routing key and routing context RC1 for signalling traffic received from network 110a for instance, and a second routing key and routing context RC2 for signalling traffic received from network 100b. It will be understood that an application server process may be configured to process traffic for more than one logical application server and in this case ASPs 310 are therefore each configured as two separate logical Application Servers having different routing contexts.

There is a correspondence between the routing context parameter and the SGPs 410, 412, 411 and 413. In this example, SGPs 410 and 411 are assumed to handle and correspond to a first routing context RC1 and SGPs 412 and 413 to handle and correspond to a second routing context RC2. These routing context parameters may be included in messages sent from the ASPs and may be used as a routing parameter by proxy 420 to identify a corresponding SGP to which to forward the messages as described below.

Thus, the signalling gateway processes 410, 411, 412, 413 need no adaptation to take into account that more than one application server is operational. Moreover, the application server processes 310 do not need to be modified to be operable in the situation where a proxy 420 is present and need not be aware that more than one SGP is handling the signalling traffic.

The details of the handling by proxy element 420 of the various types of SIGTRAN signalling messages exchanged between an SGP and an ASP will now be described.

Figure 6A:
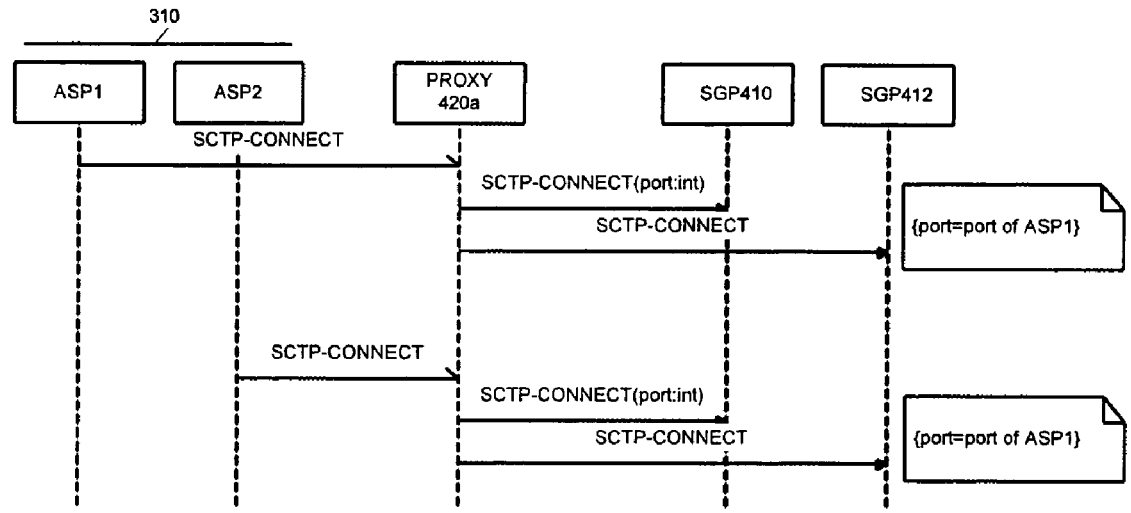
FIGS. 6a and 6b illustrate the handling of associations in the signalling gateway of FIG. 4.
Figure 6B:
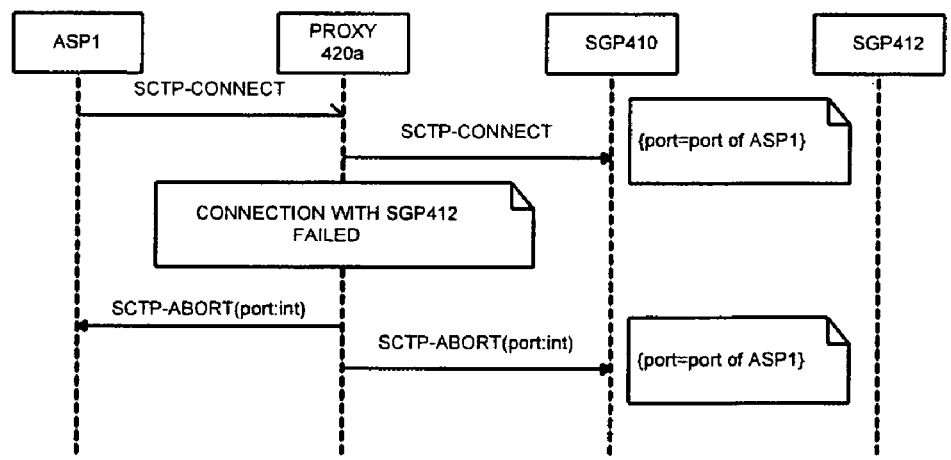

As shown in FIG. 6a, upon receipt of an SCTP-CONNECT message the proxy 420 sets up an SCTP association with each local SGP, for instance the setting up of associations with SGPs 410 and 412 are illustrated in FIG. 6a. If for any reason the connection cannot be established, the association is aborted on both sides as shown in FIG. 6b. In the topology shown in FIG. 5, for instance, each proxy component would expect to receive two such messages, from SGPs 410 and 412, in the case of proxy 420a for instance. The SCTP association ID for the SCTP associations set up with the SGPs are thereby linked with the SCTP association with the corresponding ASP from which the SCTP-CONNECT message was received.

Figure 7A:
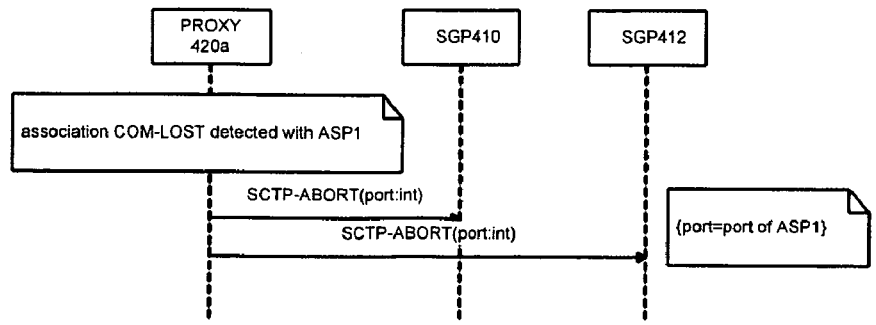
FIGS. 7a and 7b illustrate the handling of a broken association in the signalling gateway of FIG. 4.
Figure 7B:
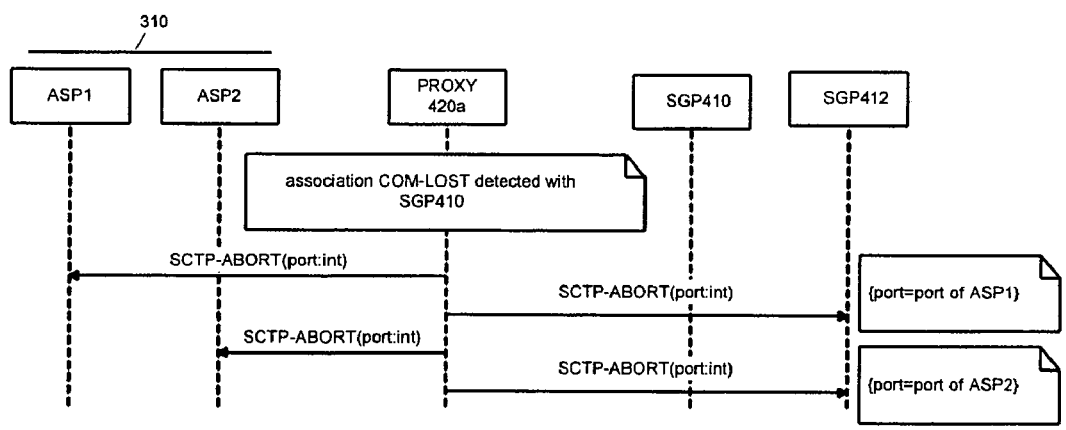

As shown in FIG. 7a, when an SCTP association is broken between an ASP and a Proxy 420, the proxy 420 aborts all its associations with the SGP to which it is attached. As shown in FIG. 7b, when an SCTP association is broken between a proxy 420 and a SGP, the association is aborted on both sides.

Figure 8A:
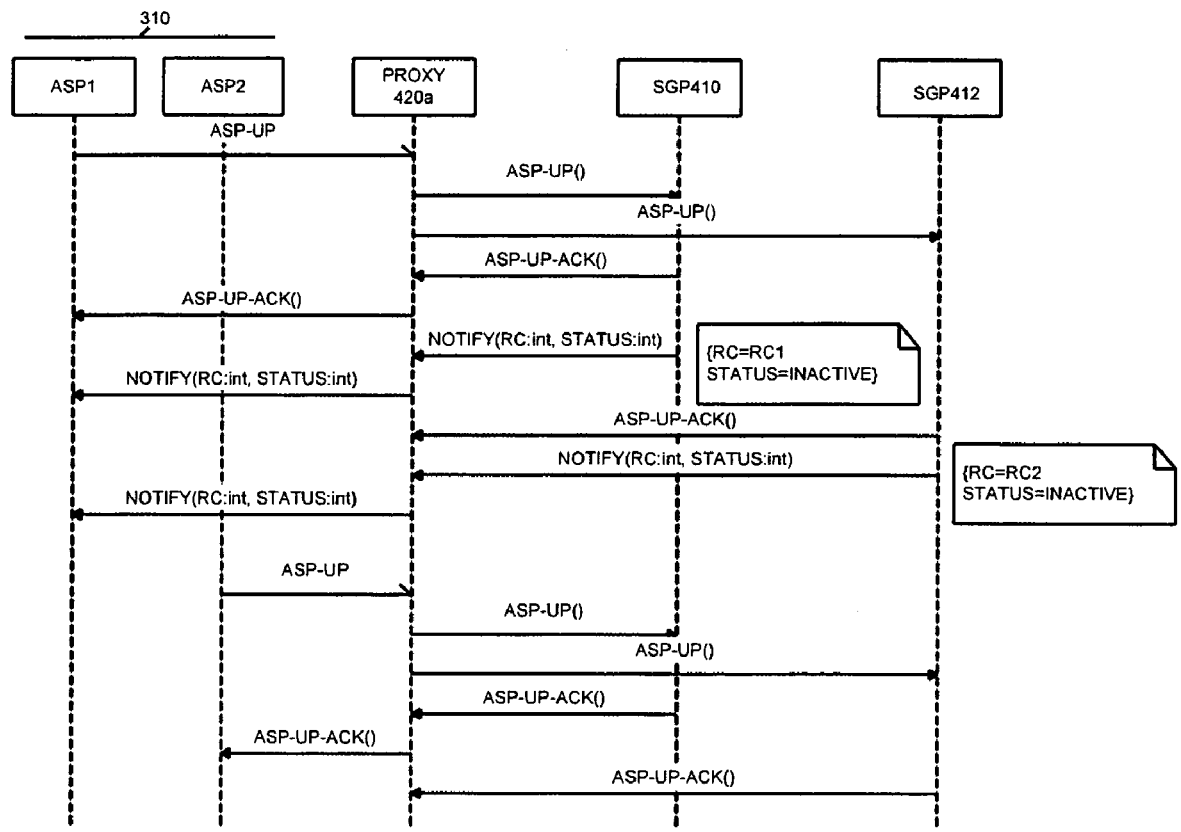
FIGS. 8a and 8b illustrate the handling of an ASP-UP in the signalling gateway of FIG. 4.
Figure 8B:
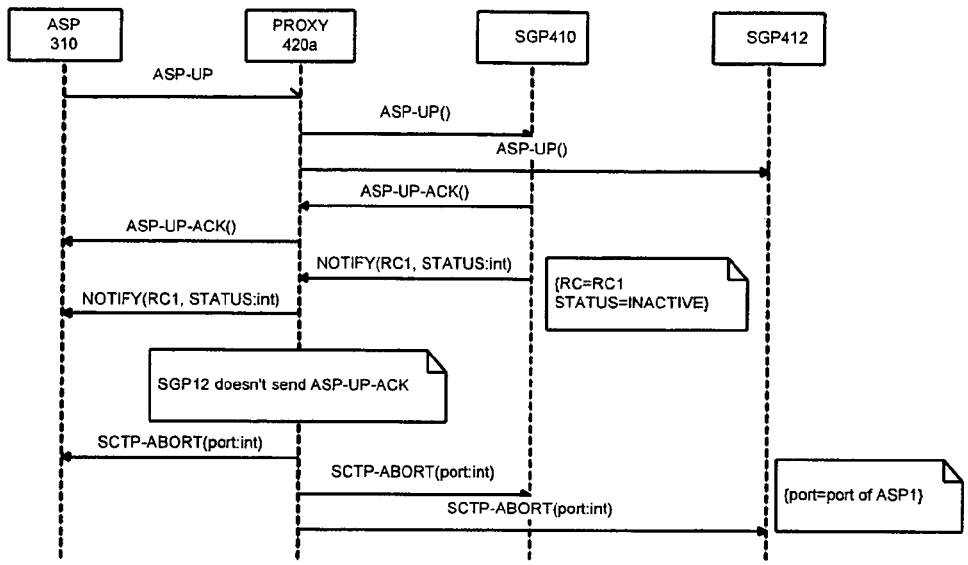

As shown in FIG. 8a, on receipt of an ASP-UP, the proxy will forward it to each SGP with which it has an association—in the case illustrated to SGP 410 and SGP 412. The ASP-UP message is used to indicate that the ASP is up and running. Each SGP will respond with an ASP-UP-ACK message. On receipt of the first ASP-UP-ACK response from an SGP, the Proxy 420 is arranged to forward an ASP-UP-ACK to the ASP from which the ASP-UP was received. As shown in FIG. 8b, if for any reason any of the SGPs doesn't respond to a message that needs a response (such ASP-UP, ASP-ACTIVE, ASP-INACTIVE, or ASP-DOWN for instance), proxy 420 aborts all the associations. Also shown in FIGS. 8a and 8b is the handling of NOTIFY messages that are used to provide an autonomous indication of events between SUA peers. NOTIFY messages are forwarded only to ASPs that are known by proxy 420 to be UP.

Figure 9:
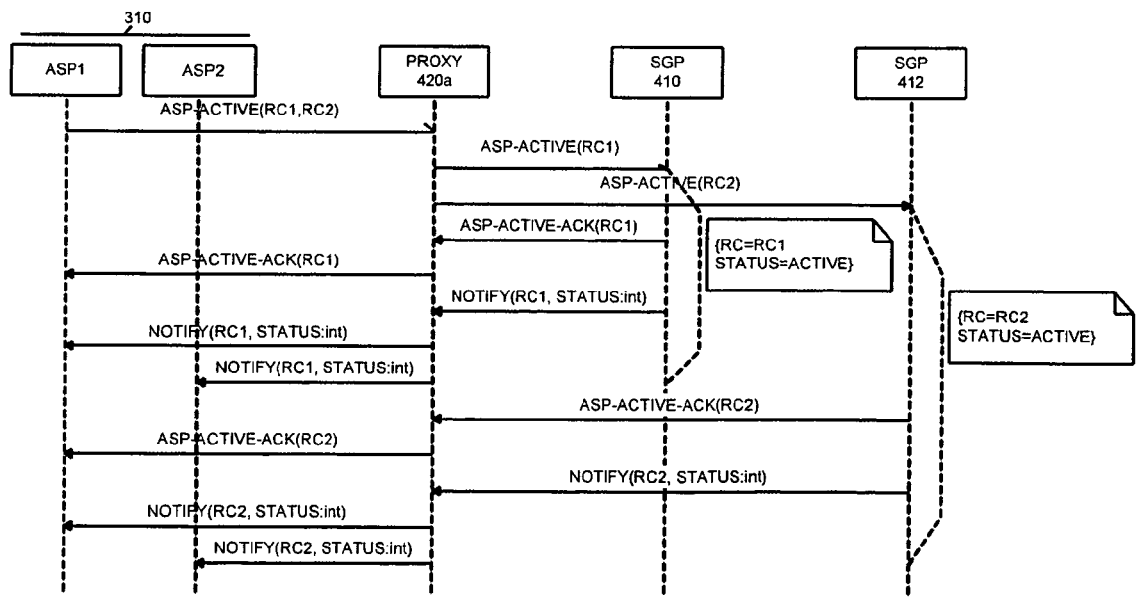
FIG. 9 illustrates the handling of an ASP-ACTIVE in the signalling gateway of FIG. 4.

ASP-ACTIVE handling is illustrated in FIG. 9. The ASP-ACTIVE message is sent by the ASP to indicate that it is ACTIVE and ready to process signalling traffic for a particular routing context or set of routing contexts. In this example, SGP1 handles a first Routing Context RC1 and SGP2 handles a second Routing Context RC2. The ASP-ACTIVE message sent from one of the ASPs contains both routing context parameters RC1 and RC2. Proxy 420 is configured in advance at configuration time with the information as to which routing context corresponds to which SGP. Separate ASP-ACTIVE messages are forwarded by proxy 420 with their corresponding routing context parameters on the corresponding associations as shown in FIG. 9.

The separate ASP-ACTIVE-ACK messages received separately from SGP 410 and 412 are simply forwarded to the ASP on the corresponding association.

Figure 10:
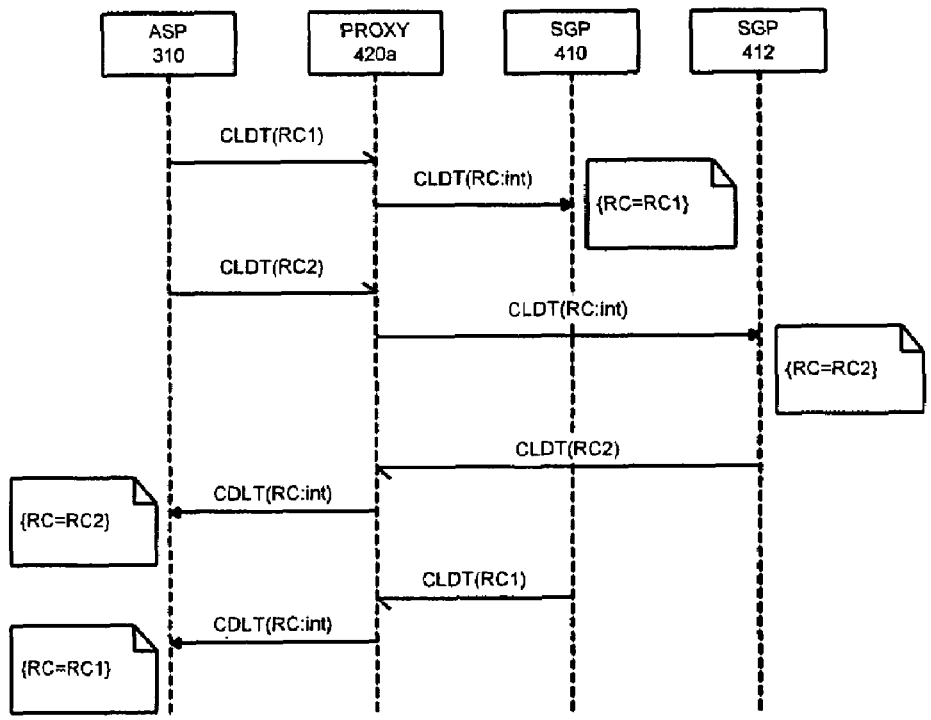
FIG. 10 illustrates the handling of CDLT messages by the signalling gateway of FIG. 4.

As shown in FIG. 10, CLDT messages received from the ASPs are forwarded to the SGP that corresponds to the Routing Context of the message. CLDT messages received from an SGP, on a particular association, are forwarded to the corresponding ASP. It will be understood that the association from which this message is received is sufficient to identify the corresponding ASP.

Figure 11A:
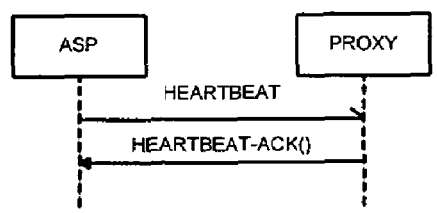
FIGS. 11a and 11b illustrate the handling of HEARTBEAT messages in the signalling gateway of FIG. 4.
Figure 11B:
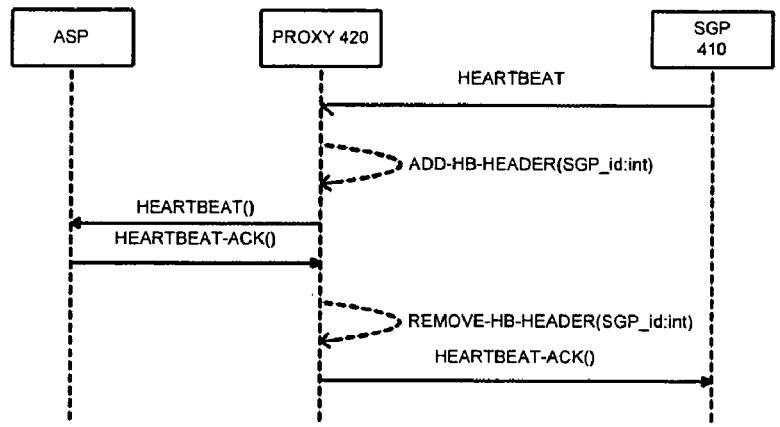

The handling of a heartbeat received from an ASP is shown in FIG. 11a. The Proxy replies to the HEARTBEAT directly, without performing any action on the SGP side. The handling of a heartbeat received from an SGP is shown in FIG. 11b. On receipt of a Heartbeat message coming from an SGP, the Proxy is arranged to send a Heartbeat message to the corresponding ASP with a DATA parameter composed of: the DATA parameter that was contained in the received Heartbeat and the Routing Context corresponding to the SGP. On receipt of the ASP HB reply (ie HBACK), the Proxy is arranged to decode the DATA parameter, remove the Routing context and forward the HBACK with this new DATA parameter. It will be understood that the routing context parameters are merely used in this case by the proxy as a convenient way for the proxy to route the HBACK message to the correct SGP, although another type of ID parameter could equally be used for this.

Figure 12A:
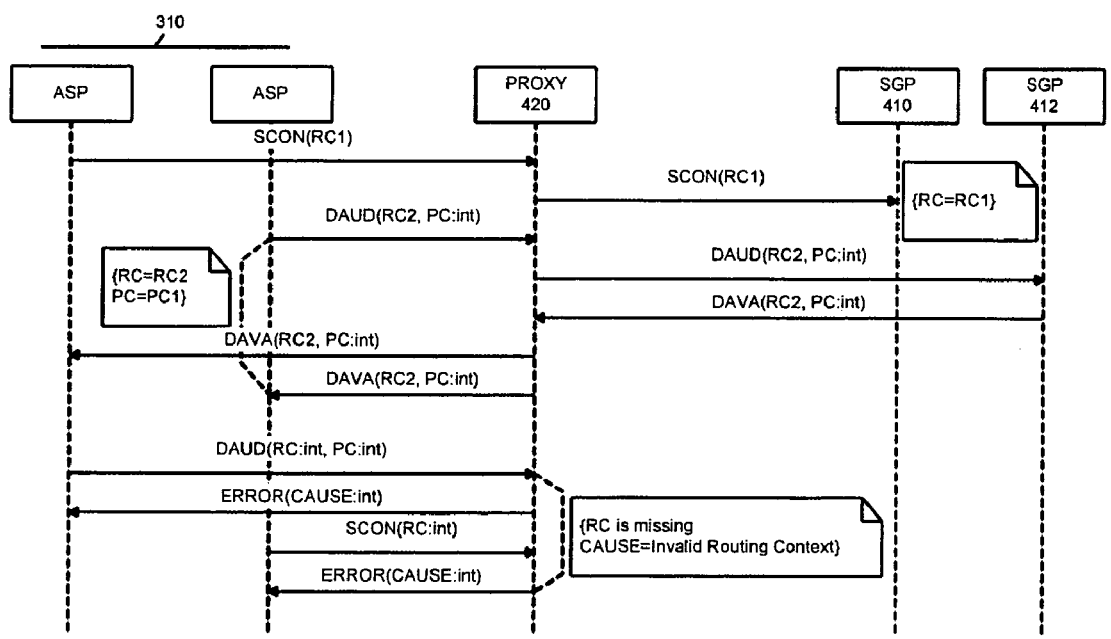
FIGS. 12a and 12b illustrate the handling of SNM messages in the signalling gateway of FIG. 4.
Figure 12B:
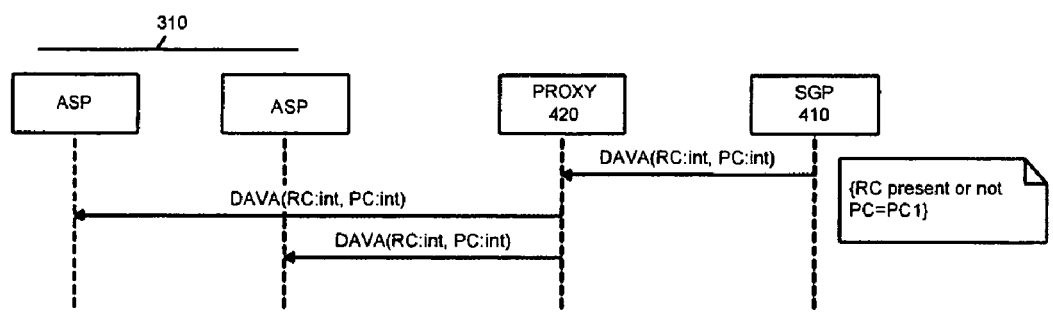

As shown in FIG. 12a, Signalling Network Management (SNM) messages, such as the SCON, DAUD, DAVA messages illustrated in FIG. 12a, received from an ASP are forwarded to the SGP that corresponds to the routing context of the message. If the routing context is not present, the message is discarded. As shown in FIG. 12b, SNM messages received from an SGP are forwarded to the ASPs according to the routing context, if present.

Figure 13:
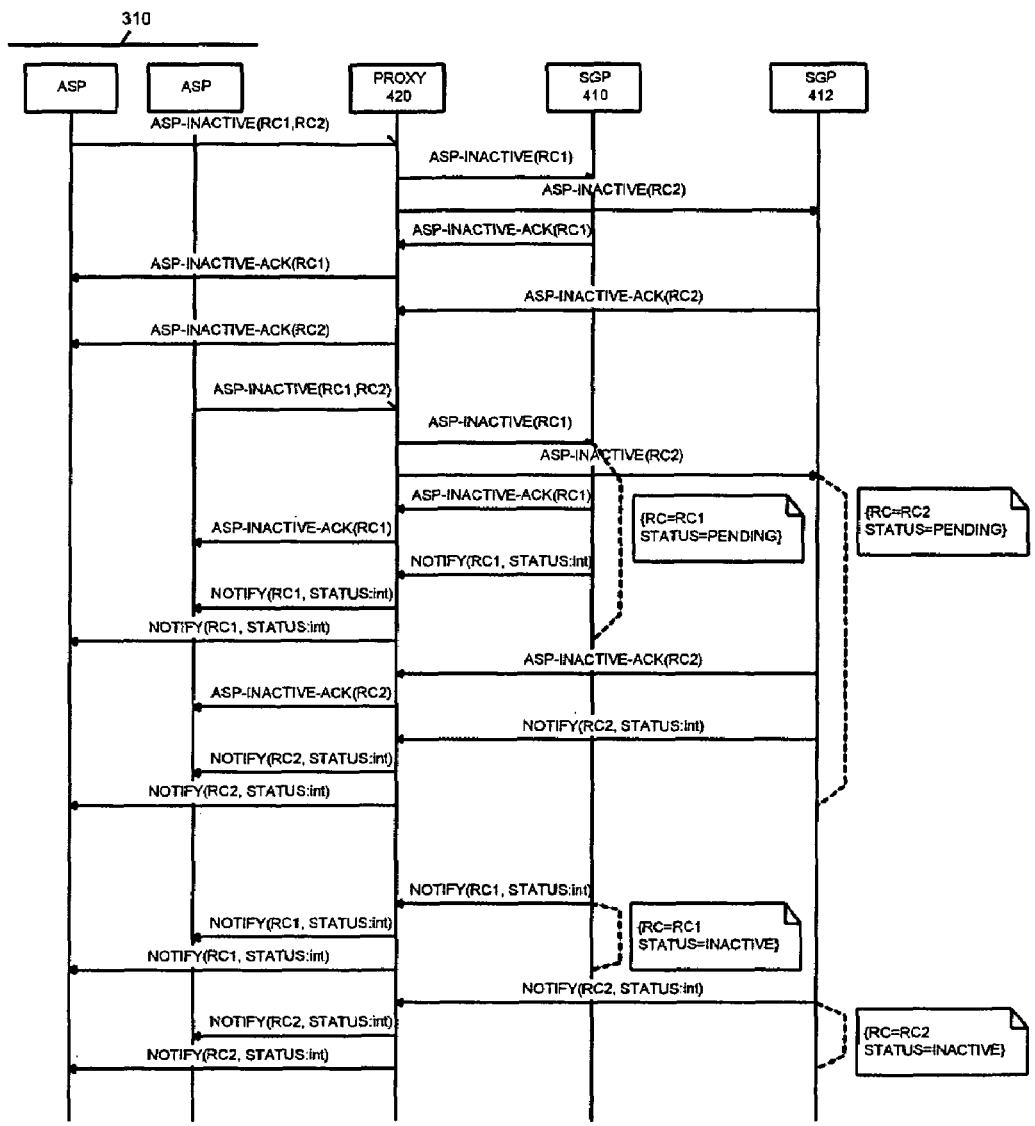
FIG. 13 illustrates the handling of ASP-INACTIVE messages by the signalling gateway of FIG. 4.
Figure 14:
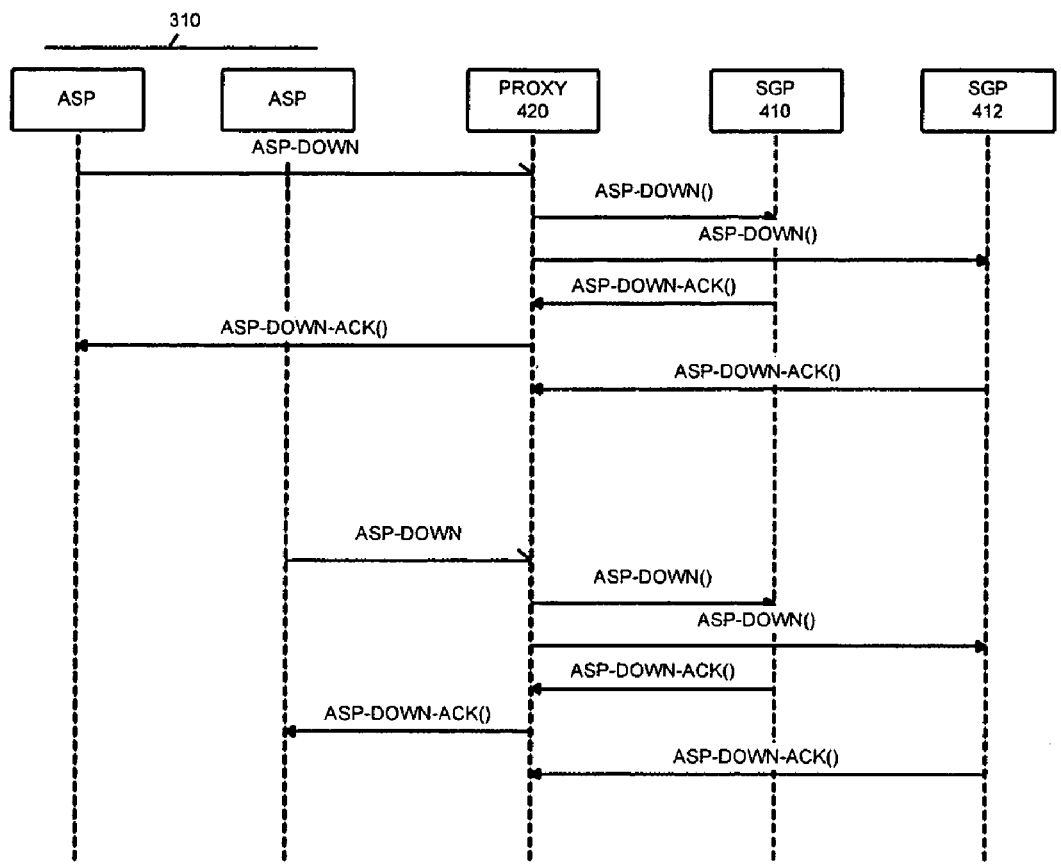
FIG. 14 illustrates the handling of ASP-DOWN messages by the signalling gateway of FIG. 4.

ASP-Inactive HANDLING is shown in FIG. 13.

ASP-Down HANDLING is shown in FIG. 13. As shown in FIG. 13, on receipt of an ASP-DOWN, proxy 420 will forward it to each SGP with which it has an association—in the case illustrated to SGP 410 and SGP 412. The ASP-DOWN message is used to indicate that the ASP is no longer up and running. Each SGP will respond with an ASP-DOWN-ACK message. On receipt of the first ASP-DOWN-ACK response from an SGP, the Proxy 420 is arranged to forward an ASP-DOWN-ACK to the ASP from which the ASP-DOWN was received.

In this embodiment, provisioning of proxy 420 is made at Proxy startup time, by reading a text file, with the information shown in Table I.

TABLE I

```
-- AS definitions
AS { Id = 1; -- internal AS identifier; RC = 1; -- AS routing context}
AS { Id = 2; RC = 2;}
-- ASP definitions
ASP {Id            = 1;   -- Internal ASP identifier
    ASLIST        = (1,2); -- this ASP serves 2 Application Servers
    IP__Addr__List =
    (10.1.1.1,10.2.2.2);
    -- ASP connects
    with this IP addr
    Port          = 1234; -- ASP uses this port}
ASP { Id          = 2;
    ASLIST        = (1,2);
    IP__Addr__List = (10.3.3.3,10.4.4.4);
    Port          = 1234;}
-- SGP definitions
SGP {Id = 1;        -- Internal SGP identifier
    IP__Addr__List = (10.8.8.8,10.9.9.9); -- SGP listen on this IP addr
    Port = 14001; -- SGP listens on this port
    RC = 1;            -- The routing context to handle}
SGP {Id = 2;
    IP__Addr__List = (10.8.8.8,10.9.9.9);
    Port = 14002;
    RC = 2;}
-- Proxy definitions
Proxy { IP__Addr__List = (10.8.8.8,10.9.9.9); -- Proxy connects with this
IP addr
    Association { Id =  1; -- Internal Association identifier
        ASP = 1; -- when an association request comes from this ASP
        SGP {          -- This association is linked with this SGP
            Sgp__id            = 1; -- Internal SGP identifier
            Local __port = 1111; -- local port used for association Proxy-SGP }
        SGP {          -- and this SGP...
            Sgp__id =             2;
            Local __port = 1112; } }
    Association {Id   = 2;
        ASP = 2;
        SGP { Sgp__id          =1;
            Local_port = 1121; }
        SGP { Sgp__id          =2;
            Local_port = 1122; }}}
```

It will be understood that the SCTP associations between ASP 310 and Proxy 420 on one side and Proxy 420 and the SGP 410, 411, 412, 413 on the other side could have different characteristics in terms of inbound and outbound streams. However, message sequencing will be ensured.

Figure 15:
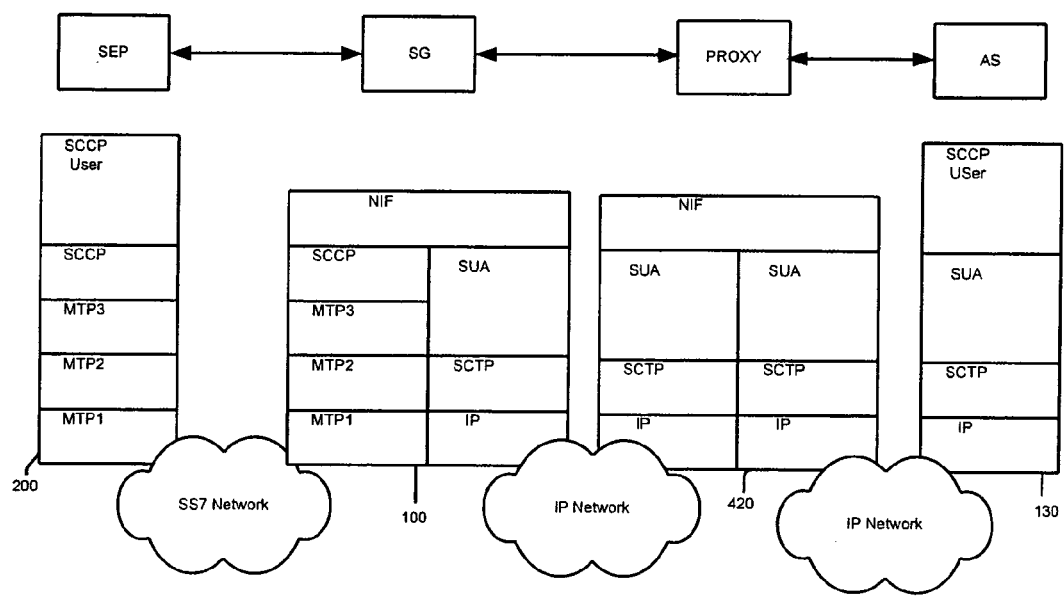
FIG. 15 shows a basic configuration of the different layers of the layered protocol communications schemes of a Signalling End Point, a Signalling Gateway Process, a proxy and an Application Server Process.

FIG. 15 illustrates the layered software architecture of the proxy component 420 in this embodiment. In this embodiment, proxy element 420 includes IP, SCTP and SUA layers interconnected by an NIF function as shown in FIG. 15.

In alternative embodiments, rather than an SUA layer on top of a SCTP layer, it is possible that the SUA layer may be combined with another communication layer, such as a TCP layer. While SCTP is preferred, and TCP is an alternative embodiment, one of ordinary skill in the art, now understanding the function of the application server process acting as the load balancer in the IP portion of a switched circuit telephone network could easily devise many communication systems and protocols to facilitate the transfers of SS7 switching signals using proxy 420. Further, it will be understood that other embodiments may use other SIGTRAN adaptation layers such as M3UA, TUA and the like. Further, each application server process discussed above could of course also be implanted by several application server processes using, for instance an interposed proxy load balancer, such as that described in U.S. published patent application 20040001517.

The foregoing discussion is premised upon one of ordinary skill in the art having a working understanding of the character and format of switching signals in the SS7 network, as well as the character and nature of converting SS7 signals for transport across IP networks. For additional information regarding SS7 network switching over IP networks, reference may be made to the (IETF) working drafts "Signalling Connecting Control Part User Adaptation Layer (SUA)" available from the IETF website at www.ietf.org, and IETF RFC 3332 "SS7 MTP3—User Adaptation Layer (M3UA)", available from the IETF website, and which is incorporated herein by reference as if reproduced in full. It is noted that each of these IETF documents is a work in progress and is therefore subject to change. However, these documents exemplify the changes necessary to a standard SS7 signalling system for its implementation in an IP network context. As well as defining the functions of signalling gateways and signalling gateway processes, the SIGTRAN documents referred to above specify in detail the protocols to be implemented between an SGP and an ASP.

More general background information regarding SIGTRAN protocols, reference may be made to the International Engineering Consortium, in document "SS7 Over IP Signalling Transport and SCTP," which is available from the IEC website www.iec.org, and which is incorporated herein by reference as if reproduced in full.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. Gateway apparatus for interconnecting at least first and second signalling networks with an application server process via a third network, the apparatus comprising:
    a plurality of signalling gateways, with at least one signalling gateway coupled to each signalling network; and
    a proxy element for transferring signalling messages between the signalling gateways and the application server process via the third network, wherein the third network is an internet protocol network, and wherein the proxy element comprises a Stream Control Transmission Protocol (SCTP) transport layer and an adaptation layer on top of the SCTP transport layer and is arranged to extract at least two routing context parameters from a single ASP-ACTIVE message and to generate and send separate ASP-ACTIVE messages to signalling gateway processes including ones of the extracted routing context parameters.

2. Gateway apparatus as claimed in claim 1 wherein the proxy element appears as a single application server process to each signalling gateway.

3. Gateway apparatus as claimed in claim 1 wherein the proxy element is configured to for use with at least one application server process that is configured to handle signalling traffic for a plurality of logical application servers, with at least one logical application server corresponding to each signalling network.

4. Gateway apparatus as claimed in claim 3 wherein each logical application server corresponds to a routing context configured in a respective signalling gateway.

5. Gateway apparatus as claimed in claim 1 wherein the first and second signalling networks are separate signalling system 7 (SS7) networks.

6. A method of operating a switched circuit telephone network, comprising:
    coupling a first telephone switch to a first signalling gateway across a first signalling network;
    coupling a second telephone switch to a second signalling gateway across a second signalling network;
    wherein the first and second signalling gateways each receive signalling messages from an application server process across a third network, wherein the third network is an internet protocol network; and
    coupling a proxy element between the first and second signalling gateways and the application server process, the proxy element being adapted to distribute the signalling messages from the application server process to the signalling gateways and to extract at least two routing context parameters from a single ASP-ACTIVE message and generate and send separate ASP-ACTIVE messages to signalling gateway processes including ones of the extracted routing context parameters.

7. A method as claimed in claim 6 comprising configuring the proxy element to appear as a single application server process to each signalling gateway.

8. A method as claimed in claim 6 comprising configuring the application server process to handle signalling traffic for a plurality of logical application servers, with at least one logical application server corresponding to each signalling network.

9. A method as claimed in claim 8 comprising configuring each logical application server to correspond to a routing context configured in a respective one of the signalling gateways.

10. A method as claimed in claim 6 wherein the first and second signalling networks are separate signalling system 7 (SS7) networks.

11. Gateway apparatus for interconnecting at least first and second SS7 signalling networks with an application server process via an Internet Protocol network, the apparatus comprising:
    a plurality of signalling gateways, with at least one signalling gateway coupled to each signalling network; and
    a proxy element for transferring signalling messages between the signalling gateways and the application server process via the third network, wherein the proxy element appears as a single application server process to each signalling gateway and is configured to for use with at least one application server process that is configured to handle signalling traffic for a plurality of logical application servers, with at least one logical application server corresponding to each signalling network, each logical application server corresponding to a routing context configured in a respective signalling gateway wherein the proxy element is arranged to extract at least two routing context parameters from a single ASP-ACTIVE message and to generate and send separate ASP-ACTIVE messages to signalling gateway processes including ones of the extracted routing context parameters.

12. A method of operating a switched circuit telephone network comprising:

coupling a first telephone switch to a first signalling gateway across a first SS7 signalling network;

coupling a second telephone switch to a second signalling gateway across a second SS7 signalling network;

wherein the first and second signalling gateways each receive signalling messages from an application server process across an Internet Protocol network;

coupling a proxy element between the first and second signalling gateways and the application server process, the proxy element being adapted to distribute the signalling messages from the application server process to the signalling gateways;

configuring the proxy element to appear as a single application server process to each signalling gateway;

configuring the application server process to handle signalling traffic for a plurality of logical application servers, with at least one logical application server corresponding to each signalling network;

configuring each logical application server to correspond to a routing context configured in a respective one of the signalling gateways;

the proxy element extracting at least two routing context parameters from a single ASP-ACTIVE message and generating and sending separate ASP-ACTIVE messages to signalling gateway processes including ones of the extracted routing context parameters.

13. A switched circuit telephone network comprising:

a first telephone switch coupled to a first signalling gateway across a first SS7 signalling network;

a second telephone switch coupled to a second signalling gateway across a second SS7 signalling network;

means in each of the first and second signalling gateways to receive signalling messages from an application server process across an Internet Protocol network;

a proxy element coupled between the first and second signalling gateways and the application server process, the proxy element comprising means adapted to distribute the signalling messages from the application server process to the signalling gateways, wherein the proxy element is configured to appear as a single application server process to each signalling gateway;

the application server process comprising means to handle signalling traffic for a plurality of logical application servers, with at least one logical application server corresponding to each signalling network, wherein each logical application server corresponds to a routing context configured in a respective one of the signalling gateways;

the proxy element comprising means to extract at least two routing context parameters from a single ASP-ACTIVE message and to generate and send separate ASP-ACTIVE messages to signalling gateway processes including ones of the extracted routing context parameters.

* * * * *